(12) United States Patent  
Adkisson (10) Patent No.: US 7,194,650 B2  
(45) Date of Patent: Mar. 20, 2007

(54) SYSTEM AND METHOD FOR SYNCHRONIZING MULTIPLE SYNCHRONIZER CONTROLLERS

(75) Inventor: Richard W. Adkisson, Dallas, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 488 days.

(21) Appl. No.: 10/629,989

(22) Filed: Jul. 30, 2003

(65) Prior Publication Data

US 2004/0225909 A1 Nov. 11, 2004

Related U.S. Application Data

(60) Provisional application No. 60/469,120, filed on May 9, 2003.

(51) Int. Cl.
*G06F 13/42* (2006.01)
*G06F 5/06* (2006.01)
*H04L 7/04* (2006.01)

(52) U.S. Cl. .................. 713/400; 713/401; 713/600; 713/601

(58) Field of Classification Search ............. None
See application file for complete search history.

(56) References Cited

U.S. PATENT DOCUMENTS

| | | | |
|---|---|---|---|
| 5,347,559 A | 9/1994 | Hawkins et al. | |
| 5,721,886 A | 2/1998 | Miller | |
| 6,075,832 A | 6/2000 | Geannopoulos et al. | |
| 6,084,934 A | 7/2000 | Garcia et al. | |
| 6,114,915 A | 9/2000 | Huang et al. | |
| 6,134,155 A | 10/2000 | Wen | |
| 6,157,233 A * | 12/2000 | Horigan et al. | ............. 327/163 |
| 6,161,188 A * | 12/2000 | Gaskins et al. | ............. 713/501 |
| 6,175,603 B1 | 1/2001 | Chapman et al. | |
| 6,246,275 B1 | 6/2001 | Wodnicki et al. | |
| 6,249,875 B1 | 6/2001 | Warren | |
| 6,326,824 B1 | 12/2001 | Hosoe et al. | |
| 6,369,624 B1 | 4/2002 | Wang et al. | |
| 6,516,362 B1 * | 2/2003 | Magro et al. | ............... 713/500 |
| 6,529,083 B2 | 3/2003 | Fujita | |
| 2002/0051509 A1 | 5/2002 | Lindner et al. | |
| 2002/0158671 A1 | 10/2002 | Wang et al. | |
| 2002/0199124 A1 | 12/2002 | Adkisson | |
| 2003/0188083 A1* | 10/2003 | Kumar et al. | ................ 710/315 |

OTHER PUBLICATIONS

Grey, Paul R., "Analysis and Design of Analog Integrated Circuits", 1993, John Wiley & Sons, Inc., Third Edition, pp. 681-682.*

* cited by examiner

*Primary Examiner*—James K. Trujillo (57) ABSTRACT

A system and method for coordinating synchronizer controllers disposed in different clock domains, e.g., a core clock domain and a bus clock domain, wherein a clock synchronizer arrangement is employed for effectuating data transfer across a clock boundary therebetween. A bus clock synchronizer controller operable in the bus clock domain includes circuitry for generating a set of inter-controller clock relationship control signals, which are provided to a core clock synchronizer controller. Responsive to the inter-controller clock relationship control signals, circuitry in the core clock synchronizer controller is operable to synchronize the core clock signal's cycle and sequence information relative to the bus clock signal.

18 Claims, 6 Drawing Sheets

SYSTEM AND METHOD FOR SYNCHRONIZING MULTIPLE SYNCHRONIZER CONTROLLERS

PRIORITY UNDER 35 U.S.C. §119(e) & 37 C.F.R. §1.78

This nonprovisional application claims priority based upon the following prior United States provisional patent application entitled: "Programmable Clock Synchronizer and Controller Arrangement Therefor," Application No.: 60/469,120, filed May 9, 2003, in the name(s) of: Richard W. Adkisson, which is hereby incorporated by reference.

CROSS-REFERENCE TO RELATED APPLICATION(S)

This application discloses subject matter related to the subject matter disclosed in the following commonly owned patent applications: (i) "Programmable Clock Synchronizer," filed Jul. 30, 2003; application Ser. No. 10/630,159, in the name(s) of Richard W. Adkisson; (ii) "Controller Arrangement for a Programmable Clock Synchronizer," filed Jul. 30, 2003; application Ser. No. 10/630,182, in the name(s) of: Richard W. Adkisson; (iii) "System and Method for Maintaining a Stable Synchronization State in a Programmable Clock Synchronizer," filed Jul. 30, 2003; application Ser. No. 10/630,297, in the name(s) of: Richard W. Adkisson; (iv) "System and Method for Compensating for Skew between a First Clock Signal and a Second Clock Signal," filed Jul. 30, 2003; application Ser. No. 10/630,317, in the name(s) of: Richard W. Adkisson; and (v) "Phase Detector for a Programmable Clock Synchronizer," filed Jul. 30, 2003; application Ser. No. 10/630,298, in the name(s) of: Richard W. Adkisson, all of which are incorporated by reference herein.

BACKGROUND

Digital electronic systems, e.g., computer systems, often need to communicate using different interfaces, each running at an optimized speed for increased performance. Typically, multiple clock signals having different frequencies are utilized for providing appropriate timing to the interfaces. Further, the frequencies of such clock signals are generally related to one another in a predetermined manner. For example, a core or system clock running at a particular frequency ($F_C$) may be utilized as a master clock in a typical computer system for providing a time base with respect to a specific portion of its digital circuitry. Other portions of the computer system's digital circuitry (such as a bus segment and the logic circuitry disposed thereon) may be clocked using timing signals derived from the master clock wherein the derived frequencies ($F_D$) follow the relationship: $F_C/F_D \geq 1$.

Because of the asynchronous—although related—nature of the constituent digital circuit portions, synchronizer circuitry is often used in computer systems to synchronize data transfer operations across a clock domain boundary so as to avoid timing-related data errors. Such synchronizer circuitry is typically required to possess low latency (which necessitates precise control of the asynchronous clocks that respectively clock the circuit portions in two different clock domains). Furthermore, since phase-locked loops (PLLs) utilized in conventional arrangements to produce clocks of different yet related frequencies can have a large amount of input/output (I/O) jitter, it is essential that the synchronizer circuitry be able to tolerate significant amounts of low frequency phase difference (or, skew) between the clocks generated thereby.

SUMMARY

In one embodiment, the invention is directed to a system and method for coordinating synchronizer controllers disposed in different clock domains, e.g., a core clock domain and a bus clock domain, wherein a clock synchronizer arrangement is employed for effectuating data transfer across a clock boundary therebetween. A bus clock synchronizer controller operable in the bus clock domain includes circuitry for generating a set of inter-controller clock relationship control signals, which are provided to a core clock synchronizer controller. Responsive to the inter-controller clock relationship control signals, circuitry in the core clock synchronizer controller is operable to synchronize the core clock signal's cycle and sequence information relative to the bus clock signal.

DETAILED DESCRIPTION OF THE DRAWINGS

Figure 1:
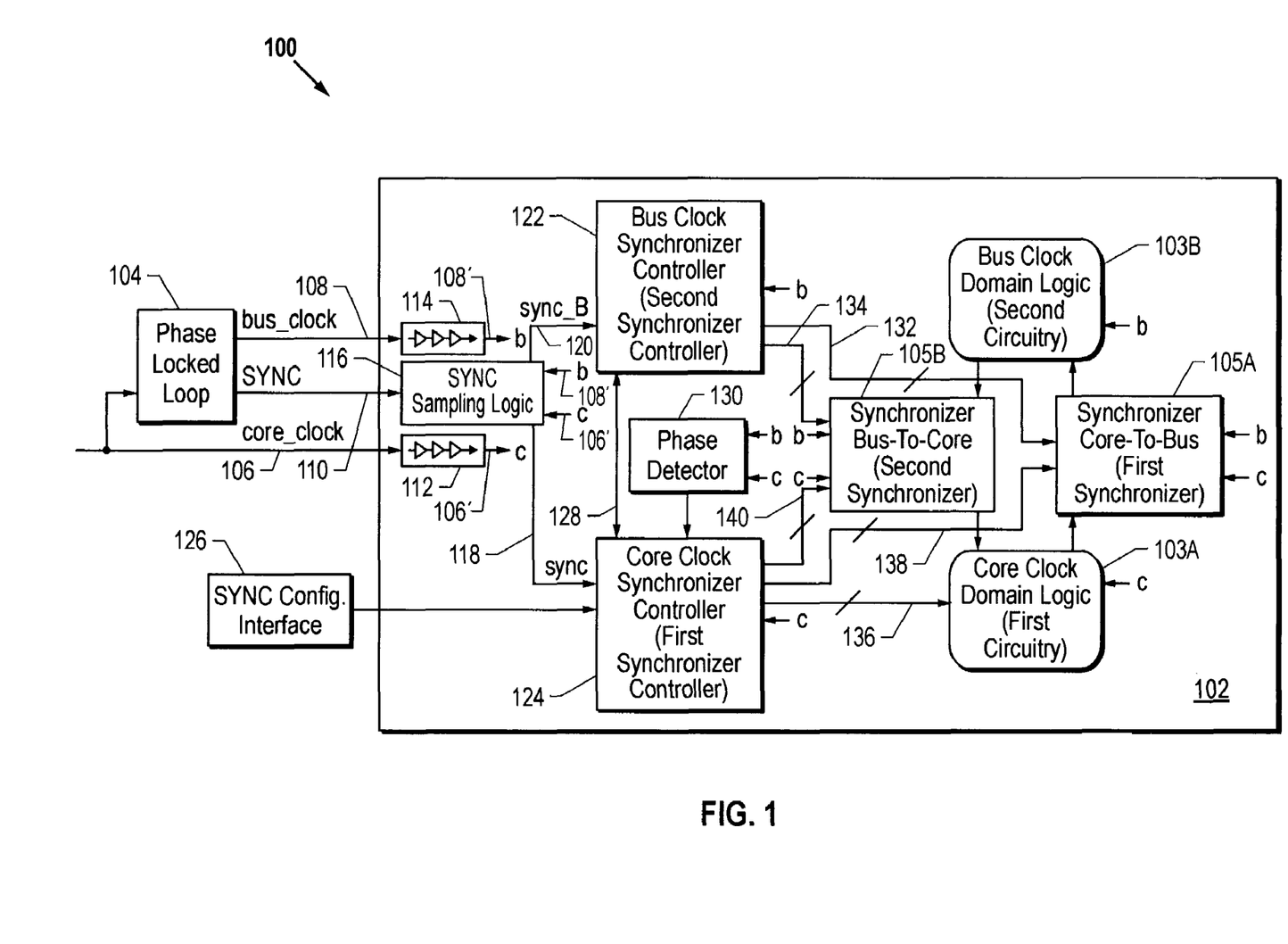
FIG. 1 depicts a block diagram of an embodiment of a programmable synchronizer system for effectuating data transfer across a clock boundary.

In the drawings, like or similar elements are designated with identical reference numerals throughout the several views thereof, and the various elements depicted are not necessarily drawn to scale. Referring now to FIG. 1, therein is depicted an embodiment of a programmable synchronizer system 100 for effectuating data transfer across a clock boundary between a first clock domain (i.e., "fast clock domain") having N clock cycles and a second clock domain (e.g., "slow clock domain") having M clock cycles such that N/M>1. Typically, M=(N−1), and by way of exemplary implementation, the synchronizer system 100 may be provided as part of a computer system for transferring data between a faster core clock domain (e.g., operating with a core clock signal of 250 MHz) and a slower bus clock domain (e.g., operating with a bus clock signal of 200 MHz), with a 5:4 frequency ratio. Accordingly, for purposes of this present patent application, the terms "first clock" and "core clock" will be used synonymously with respect to a fast clock domain; likewise, the terms "second clock" and "bus clock" will be used with respect to a slow clock domain.

A phase-locked loop (PLL) circuit 104 is operable to generate a SYNC pulse 110 and a bus clock (i.e., second clock) signal 108 (designated as bus_clock) based on a core clock (i.e., first clock) signal 106 (designated as core_clock) provided thereto. As will be seen below, the SYNC pulse 110 provides a reference point for coordinating data transfer operations and is driven HIGH when the bus_clock and core_clock signals have coincident rising edges. The two clock signals 106, 108 and SYNC pulse 110 are provided to a synchronizer/controller block 102 that straddles the clock boundary between a first clock domain (i.e., core clock domain) and a second clock domain (i.e., bus clock domain) for effectuating data transfer across the boundary. Reference numerals 103A and 103B refer to circuitry disposed in the first and second clock domains, respectively, e.g., core clock domain logic and bus clock domain logic, that transmit and receive data therebetween as facilitated via synchronizers 105A and 105B, which will be described in greater detail hereinbelow.

Each of the core_clock and bus_clock signals 106, 108 is first provided to a respective clock distribution tree block for generating a distributed clock signal that is provided to various parts of the synchronizer/controller block 102. Reference numeral 112 refers to the clock distribution tree operable with the core_clock signal 106 to generate the distributed core_clock signal, which is labeled as "c" and shown with reference numeral 106' in FIG. 1. Likewise, reference numeral 114 refers to the clock distribution tree 114 operable with the bus_clock signal 108 to generate the distributed bus_clock signal, which is labeled as "b" and shown with reference numeral 108' in FIG. 1. As one skilled in the art should readily recognize, the distributed clock signals are essentially the same as the input clock signals. Accordingly, the core_clock signal 106 and its distributed counterpart c 106' are treated equivalently hereinafter. Also, the bus_clock signal 108 and its distributed counterpart b 108' are similarly treated as equivalent.

Figure 5A:
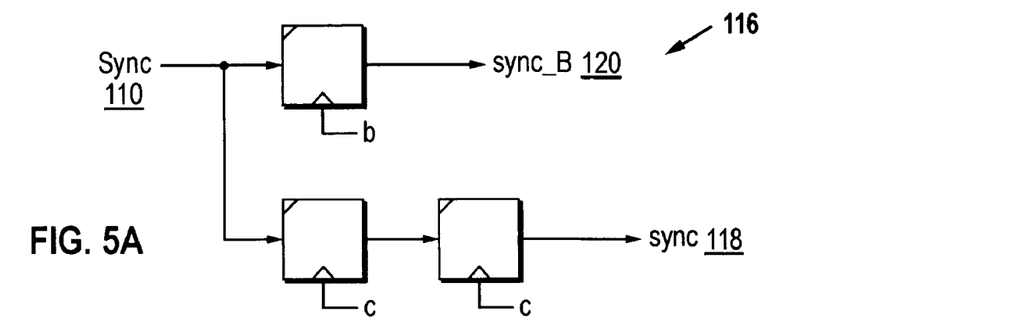
FIG. 5A depicts a block diagram of an embodiment of a SYNC sampling logic block.

A SYNC sampling logic block 116 is operable responsive to the distributed clock signals 106', 108' and SYNC pulse signal 110, to generate a pair of sampled SYNC pulses that are forwarded to appropriate synchronizer controller circuitry. As shown in additional detail in reference to FIG. 5A, the sampled SYNC pulses are manufactured as follows in one embodiment. The SYNC pulse 110 is sampled twice by two flip flop (FF) elements that are clocked on the rising edge of the distributed core_clock, c 106'. As may be appreciated, sampling by two FF elements is effective in eliminating metastability associated with the SYNC pulse 110 (possibly arising due to the skew between the input signal, core_clock 106 and the output signal, SYNC 110). The twice-sampled SYNC pulse is designated as "sync" signal 118 in FIG. 1, which is provided to a first synchronizer controller (or, core clock synchronizer controller) 124 operating in the first clock domain.

With respect to the second clock domain (i.e., bus clock domain), the SYNC pulse 110 is sampled in the SYNC sampling logic block 116 by a single FF element (shown in FIG. 5A) that is clocked on the rising edge of the distributed bus_clock, b 108'. To signify that the sampling is done using the bus_clock, the sampled SYNC pulse is designated as the "sync_B" signal 120, which is provided to a second synchronizer controller 122 operating in the second clock domain, also referred to as the bus clock synchronizer controller in FIG. 1.

The bus clock synchronizer controller 122 is operable responsive to the distributed bus_clock, b 108' and sampled sync_B pulse 120 to generate a plurality of synchronizer control signals, a portion of which signals are directed to a first synchronizer circuit means 105A operating to control data transfer from first circuitry 103A (i.e., core clock domain logic) to second circuitry 103B (i.e., bus clock domain logic). Reference numeral 132 refers to the signal path of this portion of control signals emanating from the bus clock synchronizer controller 122. Another portion of the synchronizer control signals generated by the bus clock synchronizer controller 122 are directed (via signal path 134) to a second synchronizer circuit means 105B operating to control data transfer from second circuitry 103B to first circuitry 103A. Consistent with the nomenclature used in the present patent application, the first and second synchronizer circuits may also be referred to as core-to-bus synchronizer and bus-to-core synchronizer circuits, respectively. In addition, the bus clock synchronizer controller 122 also generates a set of inter-controller control signals that are provided to the first synchronizer controller 124 (i.e., core clock synchronizer controller) such that both controllers can work together. Reference numeral 128 refers to the signal path of the inter-controller clock relationship control signal(s) provided to the core clock synchronizer controller 124. As will be seen in additional detail below, part of the functionality of the inter-controller clock relationship control signals is to provide clock relationship information to the core clock synchronizer controller 124 so that it can generate its synchronizer control signals at an appropriate time with respect to the bus and core clock signals.

Similar to the operation of the bus clock synchronizer controller 122, the core clock synchronizer controller 124 is operable responsive to the distributed core_clock, c 106', inter-controller control signals and sampled sync pulse 118 to generate a plurality of synchronizer control signals, a portion of which signals are directed to the first synchronizer circuit means 105A and another portion of which signals are directed to the second synchronizer circuit means 105B. Reference numerals 138 and 140 refer to the respective signal paths relating to these control signals. The core clock synchronizer controller 124 also generates data transmit/receive control signals that are provided to the core clock domain logic 103A via signal path 136 in order that the core clock domain logic 103A knows when it can send data to the bus clock domain logic 103B (i.e., valid TX operations) and when it can receive data from the bus clock domain logic 103B (i.e., valid RX operations).

All control signals from the bus clock synchronizer controller 122 to the first and second synchronizers 105A, 105B are staged through one or more FF elements that are clocked with the distributed bus_clock, b 108'. Likewise, the control signals from the core clock synchronizer controller 124 are staged through a number of FF elements clocked with the distributed core_clock, c 106', before being provided to the various parts of the synchronizer system 100. Accordingly, as will be seen in greater detail below, the various control signals associated with the synchronizer system 100 may be designated with a signal label that is concatenated with a "_ff" or "_ff_B" suffix to indicate the registration process by the distributed core_clock or the distributed bus_clock.

A phase detector 130 detects phase differences (i.e., skew) between the two clock signals by operating responsive to the sampled bus_clock and core_clock signals. This information is provided to the core clock synchronizer controller 124, which can compensate for the skew or determine appropriate times to coordinate with the bus clock synchronizer controller 122.

As will be seen below in further detail, where the bus clock signal is stable with respect to the SYNC pulse, the inter-controller clock relationship control signals are generated by the bus clock synchronizer controller 122 that provide information as to the frequency ratio of the first and second clock signals, clock sequence information and SYNC delay, which are transmitted to the core clock synchronizer controller 124 for synchronizing its core clock signal in accordance therewith. On the other hand, where the core clock signal is stable with respect to the SYNC pulse, the inter-controller clock relationship control signals are generated by the core clock synchronizer controller 124 for transmission to the bus clock synchronizer controller 122 so that both synchronizer controllers may be appropriately synchronized. Further, a configuration interface 126, labeled as SYNC_Config in FIG. 1, is provided as part of the programmable synchronizer system 100 for configuring the core clock synchronizer controller 124 so that it may be programmed for different skew tolerances, latencies and modes of operation. In one embodiment, the configuration interface 126 may be implemented as a register having a plurality of bits. In another embodiment, a memory-based setting, e.g., EPROM-stored settings, may be provided as a SYNC configuration interface.

As set forth above, the clock synchronizer system 100 is operable to be configured for different skew tolerances and latencies, so that data transfer at high speeds can proceed properly even where there is a high skew or requirement of low latency. Further, the synchronizer system 100 can operate with any two clock domains having a ratio of N first clock cycles to M second clock cycles, where N/M≧1. For purposes of illustration, the operation of an embodiment of the programmable synchronizer system 100 and its controller arrangement (i.e., the bus clock synchronizer controller portion 122 and core clock synchronizer controller portion 124), including a system and method for coordinating the constituent controller portions, is set forth in detail below for clock domains with a 5:4 frequency ratio.

Figure 2:
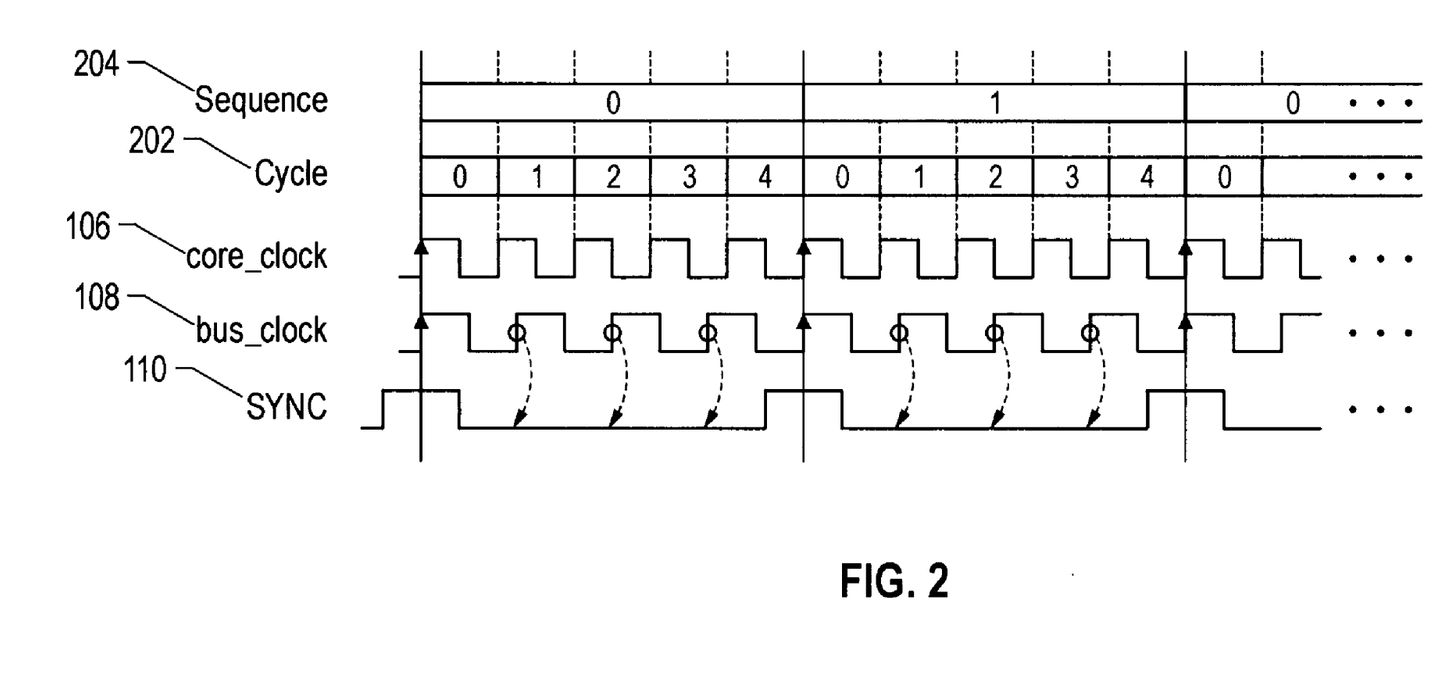
FIG. 2 depicts a timing diagram of two clock domains having a 5:4 frequency ratio wherein the programmable synchronizer system of FIG. 1 may be utilized for effectuating data transfer across the clock boundary.

Referring now to FIG. 2, depicted therein is a timing diagram 200 associated with two clock domains having a 5:4 frequency ratio. By way of example, the core_clock signal 106 is provided as the fast clock and the bus_clock signal 108 is provided as the slow clock. Accordingly, for every five ticks of the core_clock, there are four ticks of the bus_clock. As alluded to before, the SYNC pulse 110 is generated when a rising edge of the core_clock signal 106 coincides with a rising edge of the bus_clock signal 108, which commences a timing sequence window 204 for the transfer of data, that may comprise k-bit wide data (k≧1), from one clock domain to the other clock domain. A cycle count 202 refers to the numbering of core_clock cycles in a particular timing sequence 204.

As pointed above, the SYNC pulse 110 is driven HIGH on coincident rising edges of the clock signals and the data transfer operations across the clock boundary between the two clock domains are timed with reference to the SYNC pulse. In a normal condition where there is no skew (or, jitter, as it is sometimes referred to) between the clock signals, the coincident edges occur on the rising edges of the first cycle (cycle 0) as shown in FIG. 2. Since there are five core_clock cycles and only four bus_clock cycles, the first clock domain circuitry cannot transmit data during one cycle, resulting in what is known as a "dead tick," as the second clock domain circuitry does not have a corresponding time slot for receiving it. Typically, the cycle that is least skew tolerant is the one where data is not transmitted. Likewise, because of an extra cycle (where the data is indeterminate and/or invalid), the first clock domain circuitry cannot receive data during one cycle. Again, it is the cycle with the least skew tolerance during which the data is not received by the first clock domain circuitry.

Skew between the clock signals can cause, for example, a variance in the positioning of the SYNC pulse which affects the data transfer operations between the two domains. In the exemplary 5:4 frequency ratio scenario set forth above, if the bus_clock 108 leads the core_clock 106 by a quarter cycle for instance, then instead of the edges being coincident at the start of cycle 0, they will be coincident at the start of cycle 1. In similar fashion, if the bus_clock signal lags the core_clock signal by a quarter cycle, the edges will be coincident at the start of the last cycle (i.e., cycle 4). Regardless of the skew between the clock cycles, however, there will be one cycle where data cannot be sent and one cycle where data cannot be received, from the perspective of the core clock domain circuitry.

The following commonly owned co-pending U.S. patent applications describe the various functional blocks and sub-systems of the programable clock synchronizer system 100 in additional detail with respect to providing the overall functionality of controlling the bus clock and core clock synchronizers so as to properly synchronize data transfer operations even under variable skew and latency requirements: (i) "Programmable Clock Synchronizer," filed Jul. 30, 2003; application Ser. No. 10/630,159, in the name(s) of: Richard W. Adkisson; (ii) "Controller Azrangement for a Prograitunable Clock Synchronizer," filed Jul. 30, 2003; application Ser. No. 10/630,182, in the name(s) of: Richard W. Adkisson; (iii) "System and Method for Maintaining a Stable Synchronization State in a Prograitunable Clock Synchronizer," filed Jul. 30, 2003; application Ser. No. 10/630,297, in the name(s) of: Richard W. Adkisson; (iv) "System and Method for Compensating for Skew between a First Clock Signal and a Second Clock Signal," filed Jul. 30, 2003; application Ser. No. 10/630,317 in the name(s) of: Richard W. Adkisson; and (v) "Phase Detector for a Programmable Clock Synchronizer," filed Jul. 30, 2003; application Ser. No. 10/630,298, in the name(s) of: Richard W. Adkisson, all of which are incorporated by reference herein.

In the discussion set forth immediately below, a system and method for coordinating two synchronizer controllers disposed in different clock domains, e.g., a bus clock synchronizer controller disposed in the bus clock domain and a core clock synchronizer controller disposed in the core clock domain, will now be described in particular detail.

Figure 3:
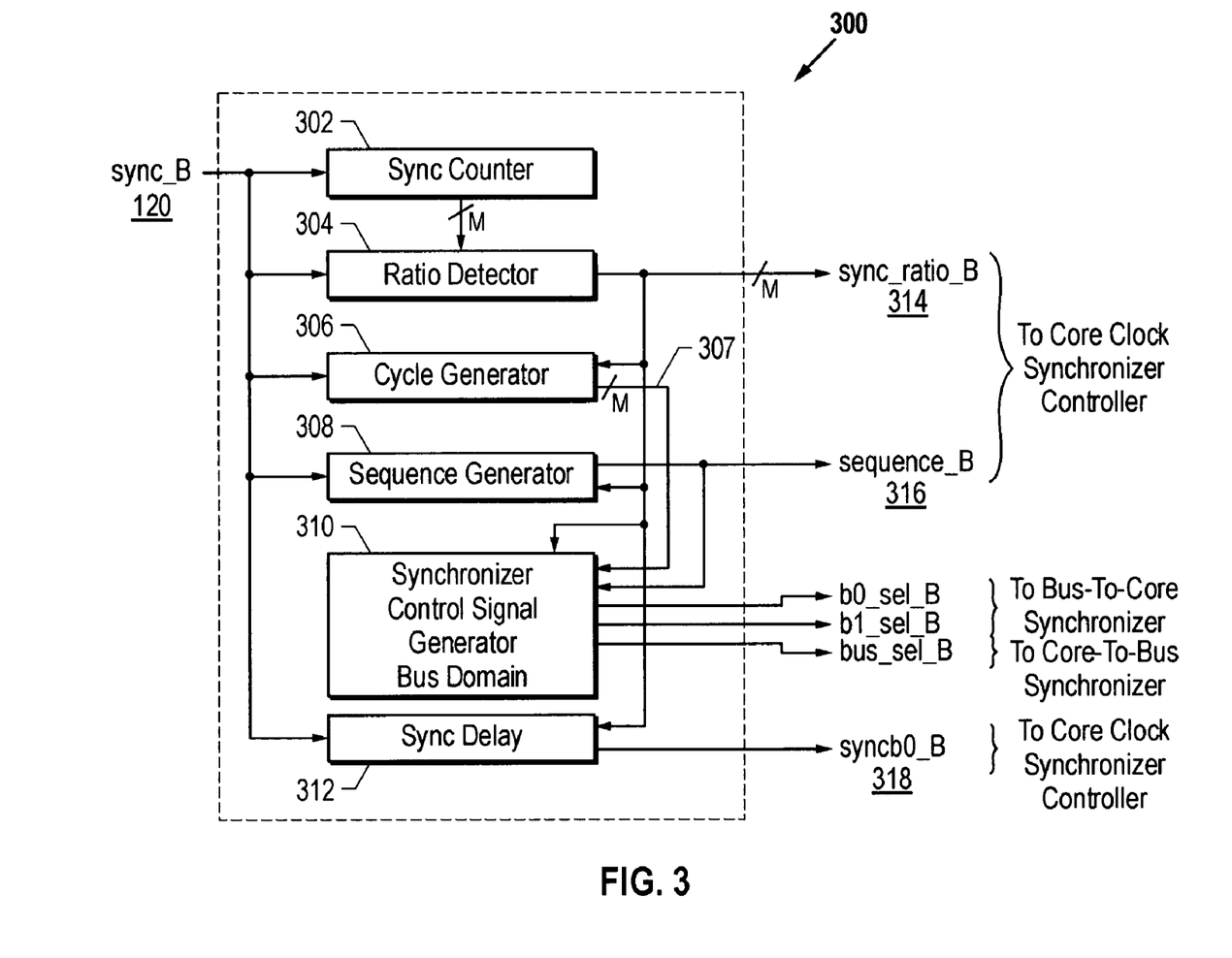
FIG. 3 depicts a block diagram of an embodiment of a bus clock synchronizer controller for controlling a bus-to-core synchronizer circuit provided as part of the programmable synchronizer system shown in FIG. 1.

FIG. 3 depicts a block diagram of an embodiment of a bus clock synchronizer controller portion 300 that is operable as synchronizer controller 122 for controlling the bus-to-core synchronizer circuit 105B shown in FIG. 1. As illustrated, several functional blocks, which may be implemented using any logic circuitry, are provided as part of the bus clock synchronizer controller portion 300 for generating a number of inter-controller clock relationship control signals, part of which are used internally to generate a set of bus domain synchronizer control signals towards the bus-to-core and core-to-bus synchronizers. A sync counter block 302 is operable responsive to the sampled SYNC, i.e., sync_B 120, as well as the distributed bus_clock, b 108' (not shown in this FIG.) for generating an M-bit wide signal that indicates a count of SYNC pulses. In general, $M=\log_2(N+1)$, where N is the number of cycles in the slow clock domain. For instance, where a clock ratio of [8:7] is employed, $M=\log_2(7+1)=3$, i.e., a 3-bit wide signal is generated. A ratio detector block 304 operates responsive to the M-bit wide signal as well as the sync_B signal 120 and b 108' to determine the frequency ratio of the clocks employed in the synchronizer system 100 and generate a clock relationship control signal, i.e., clock frequency ratio signal, designated herein as sync_ratio_B 314. As will be seen below, this and other inter-controller clock relationship control signals are provided to the core clock synchronizer controller portion for coordinating its functionality relative to the bus_clock signal.

A cycle generator block 306 is operable responsive to the sync_ratio_B signal 314 as well as the sync_B signal 120 and b 108' for generating a cycle information signal 307 indicative of a current bus clock cycle. A sequence generator block 308 is provided for generating another inter-controller clock relationship control signal, sequence_B 316, in response to the sync_ratio_B signal 614 as well as the sync_B signal 120 and b 108'. It should be appreciated by one skilled in the art that the cycle information and sequence_B signals operate to uniquely identify different bus clocks in the synchronizer system 100. A sync delay block 312 is responsible for generating another clock relationship control signal, syncb0_B 318, towards the core clock synchronizer controller portion of the controller arrangement. By way of implementation, the sync delay block 312 is operable to delay the sync_B signal by a number of bus clock cycles to identify the expected beginning of an initial bus clock cycle.

A bus domain synchronizer control signal generator block 310 is operable responsive to the cycle information signal (which numbers each bus clock cycle), the sequence_B signal 316 (which numbers a sequence of bus clocks) and sync_ratio_B signal 314 for generating a set of bus domain synchronizer control signals, namely, b0_sel_B and b1_sel_B signals towards the bus-to-core synchronizer 105B and bus_sel_B signal towards the core-to-bus synchronizer 105A, which function as described in the foregoing cross-referenced U.S. patent applications. As set forth therein, the bus domain synchronizer control signal generator block 310 essentially operates to generate a fixed pattern on these control signals for each different bus clock (based on the cycle, sequence and clock ratio inputs).

In operation, the sync counter block 302 is operable to count the number of cycles the sync_B signal 120 is LOW following the occurrence of the SYNC pulse. The counter 320 accordingly clears when sync_B is one and does not roll over the maximum ratio. As pointed out in the foregoing, this information is used by the ratio detector block 304 (which loads when sync_B is one) for determining the core clock to bus clock frequency ratio. For example, three LOW periods would be detected in the 5:4 example shown in FIG. 2. Therefore, the number of bus clock cycles is 3+1=4 and the ratio is 4+1:4 or 5:4, accordingly. If the SYNC is constantly HIGH or LOW, the ratio would then be 1:1.

Further, as can be appreciated by those skilled in the art, the foregoing methodology of determining clock ratios (based on the operation of sync counter 302 and ratio detector 304 of the bus clock synchronizer controller portion 300 for sampling the SYNC signal) works well for all ratios N+1:N except the 2:1 ratio. Therefore, the SYNC sampling functionality by a sync counter and ratio detect block may be provided in a core clock synchronizer controller portion, which samples the SYNC signal (or, its sync variant) using the core_clock to determine the number of cycles the sync signal is LOW.

The cycle generator block 306 is operable as a counter that clears on the first cycle (when sync_B is one), else it counts up the cycles. Thus, the cycle generator block 306 identifies each bus clock cycle. The sequence generator block 308 first outputs a sequence of zeros but flips every time sync_B is HIGH. This operation, accordingly, defines an initial sequence, which may be arbitrarily identified as sequence 0, followed by a sequence 1, then by a sequence 0, and so on.

As alluded to before, the sync delay block 312 delay sync_B by a number of bus clock cycles based on the clock ratio such that its output, i.e., delayed_sync signal that is designated as syncb_0 318, is HIGH on the bus clock cycle 0 (the cycle after SYNC is asserted HIGH). Thus the logic components of the bus clock synchronizer controller portion 300 operate to define the clock frequency ratio, initial cycle (i.e., cycle 0) and initial sequence (i.e., sequence 0), which information is transmitted to a core clock synchronizer controller portion via the inter-controller clock relationship signals (sync_ratio_B 314, sequence_B 316 and syncb0_B 318), which then aligns itself to cycle 0 and sequence 0 so that the bus and core control signals are properly synchronized.

Figure 4:
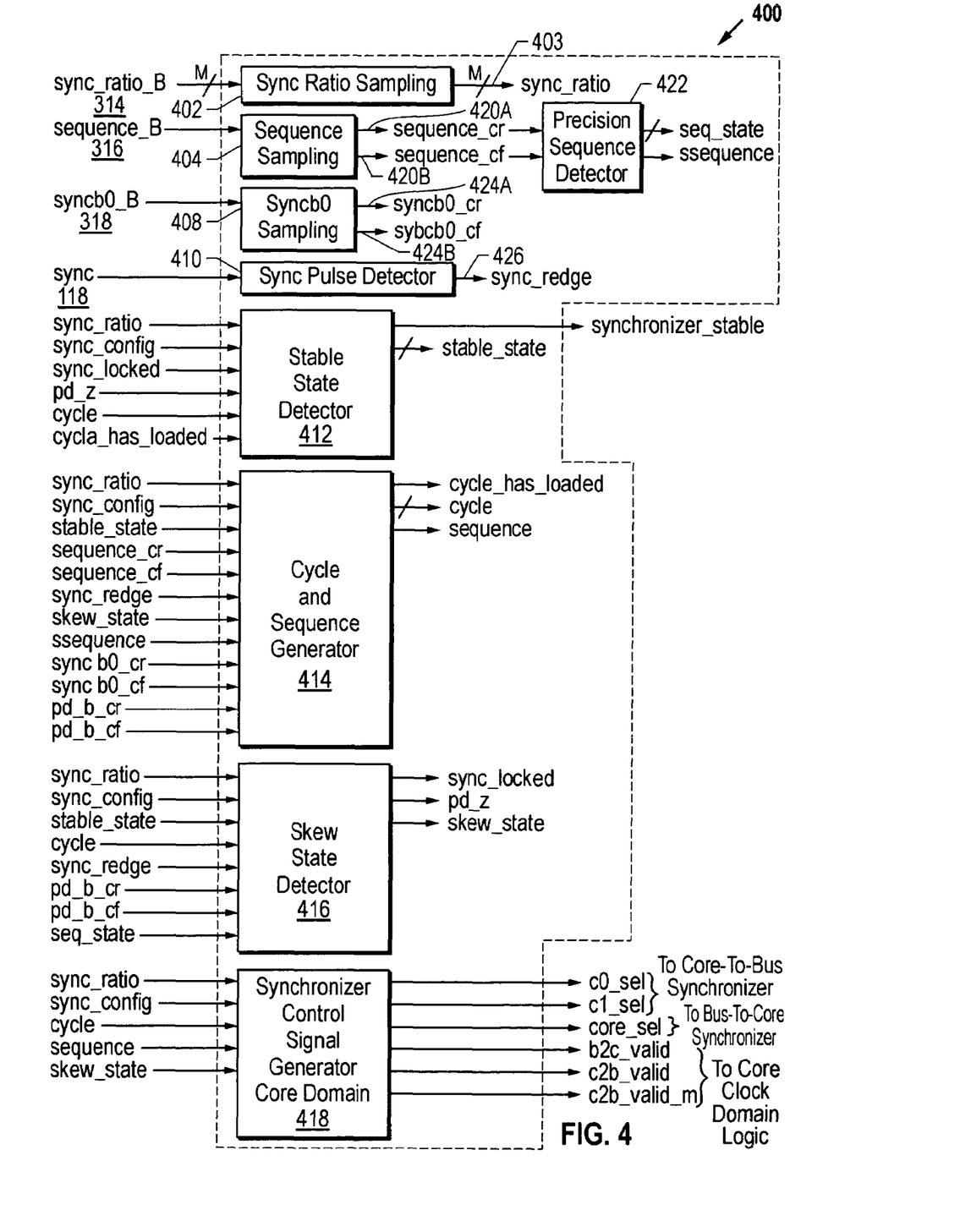
FIG. 4 depicts a block diagram of an embodiment of a core clock synchronizer controller for controlling a core-to-bus synchronizer circuit provided as part of the programmable synchronizer system shown in FIG. 1.

Referring now to FIG. 4, depicted therein is a block diagram of an embodiment of a core clock synchronizer controller portion 400, operable as synchronizer controller 124 of the programmable synchronizer system 100 set forth above. Several functional blocks are illustrated for concisely capturing the overall functionality of the core clock synchronizer controller portion 400, which essentially operates to generate a set of core domain synchronizer control signals towards the respective synchronizers 105A, 105B, in response to the sampled sync pulse 118, the inter-controller clock relationship control signals 314, 316, 318, and configuration information provided via SYNC configuration interface 126. These core domain synchronizer control signals function as described in the foregoing cross-referenced U.S. patent applications for effectuating synchronized data transfer. Furthermore, as will be seen below, the inter-controller clock relationship control signals are utilized by select components of the core clock synchronizer controller portion for coordinating the core clock signal's cycle and sequence relative to the bus clock signal as part of the overall functionality of the core clock synchronizer controller portion even where different clock ratios are employed under variable skew and/or latency requirements.

Figure 5B:
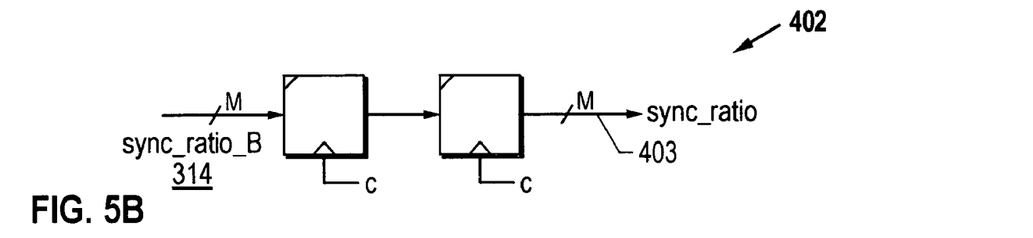
FIG. 5B depicts a block diagram of an embodiment of a sync ratio sampling block provided as part of the core clock synchronizer controller shown in FIG. 4.

A sync ratio sampling block 402 receives the M-bit wide sync_ratio_B 314 from the bus clock synchronizer controller portion 300 to generate a sync ratio signal that is sampled in the core clock domain using the distributed core clock c 106'. FIG. 5B depicts an exemplary embodiment of the sync ratio sampling block 402 which synchronizes the sync_ratio_B signals from the bus clock domain by sampling them twice (for eliminating metastability) with two stages of flip flops clocked in the core clock domain to generate a sync ratio signal 403. Since the clock frequency ratio should not change once the ratio is detected in the bus clock domain (and sampled in the core clock domain), the system for coordinating the bus clock and core clock synchronizer controllers ensures that the value is stable by using a stable state detector block 412 of the core clock synchronizer controller portion. As described in the following cross-referenced U.S. patent application entitled "System arid Method for Maintaining a Stable Synchronization State in a Programmable Clock Synchronizer," filed Jul. 30, 2003; application Ser. No. 10/630,297, the stable state detector block 412 first waits for the clock ratio to be stabilized by determining that the sync_ratio signals do not change for a number of clock cycles in the core clock domain.

Figure 5C:
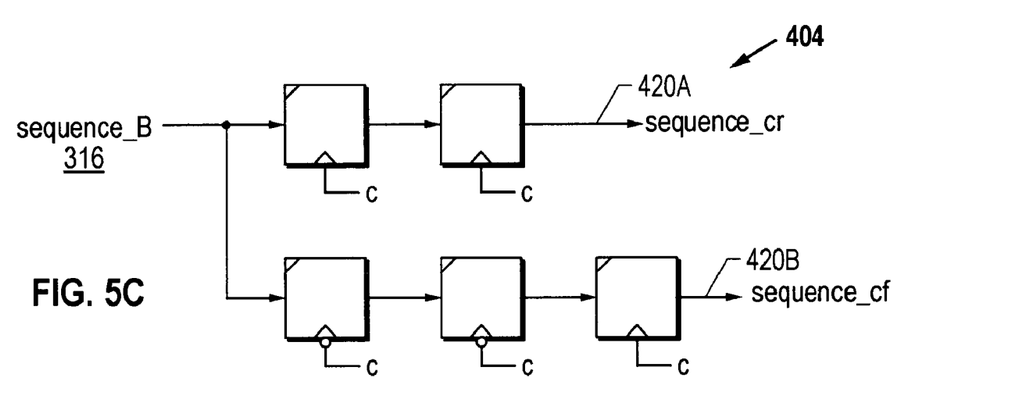
FIG. 5C depicts a block diagram of an embodiment of a sequence sampling block provided as part of the core clock synchronizer controller shown in FIG. 4.
Figure 5D:
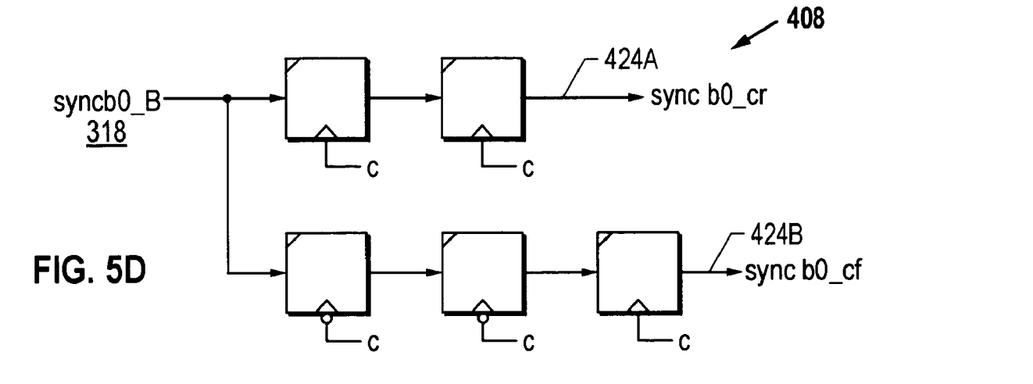
FIG. 5D depicts a block diagram of an embodiment of a syncb0 sampling block provided as part of the core clock synchronizer controller shown in FIG. 4.

The core clock synchronizer controller portion 400 synchronizes the sequence_B signal 316 from the bus clock domain using a sequence sampler block 404 which operates responsive to sequence_B 316 to generate sequence_cr (sampling on the rising edge of the c clock) and sequence_cf (sampling on the falling edge of the c clock) signals, reference numerals 420A and 420B, respectively, that are used by a precision sequence detector block 422 and cycle and sequence generator 414. Likewise, a delayed_sync sampling block or syncb0_B sampling block 408 operates responsive to syncb0_B 318 to generate syncb0_cr and syncb0_cf signals 424A, 424B. FIGS. 5C and 5D depict, respectively, the embodiments of the sequence sampling block 404 and syncb0_B sampling block 408.

Figure 5E:
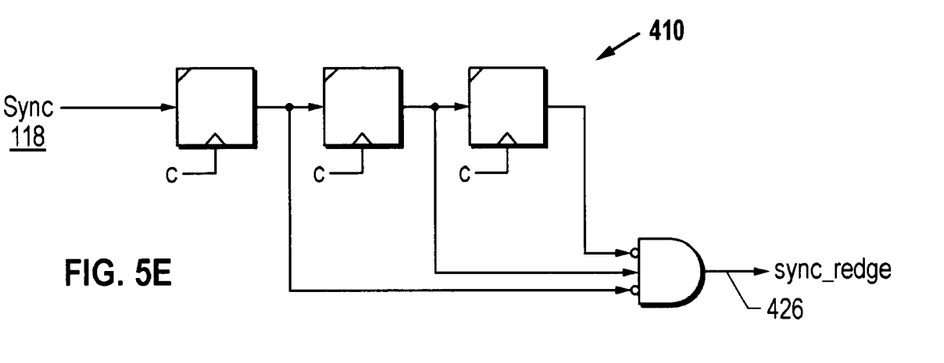
FIG. 5E depicts a block diagram of an embodiment of a sync pulse detection block provided as part of the core clock synchronizer controller shown in FIG. 4.

The sync pulse 118 provided by the SYNC sampling logic 116 is detected by a sync pulse detection block 410 to generate an internal sync signal, sync_redge 426. FIG. 5E shows an embodiment of the sync pulse detection block 410 for detecting a "010" sequence on the sync pulse, indicating a reliable sync pulse (otherwise, there may be too much clock skew).

Based on the foregoing discussion, it should be recognized that sync ratio sampling block 402, sequence sampling block 404, synb0 sampling block 408, in conjunction with sync pulse detector block 410 operate to generate a set of internal control signals (or, intermediary control signals used internally with respect to the core clock synchronizer controller portion 400) that provide the functionality necessary to coordinate the core_clock signal relative to the bus_clock signal. The core clock synchronizer controller portion 400 is operable to align its cycle to the clock information provided by the bus clock synchronizer controller, by having its cycle and sequence generator block 414 use sync_redge 426 (when the output from the stable state detector block 412, i.e., the stable_state signal, is zero) to load the expected cycle, which depends on the sync_ratio and how many registers are disposed between SYNC and sync_redge. Otherwise, that is, if the stable_state signal is not equal to zero or sync_redge is not asserted, a zero is loaded on the last cycle (depending again on the sync_ratio), else the cycle counter is incremented.

In normal operation, the core clock synchronizer controller portion aligns the core clock's sequence with respect to the bus clock's sequence by loading it from sequence_cf 420A in the middle of the sequence (which depends on the sync_ratio and cycle information). This sequence value is simply inverted on the last cycle (again depending on the sync_ratio and cycle values). As shown in FIG. 5C, sequence_B 316 is sampled on both rising and falling edges of the core_clock signal in parallel sampling chains so as to minimize clock or SYNC pulse wander. For other modes of synchronizer controller operation that track the clock skew more precisely, other intermediary signals, i.e., sequence_cr 420B, syncb0_cr 424A, and syncb0_cf 424B, may be used for loading a properly aligned sequence value with respect to the core_clock signal. These operations may be performed in the cycle and sequence generator block 414 that is operable responsive to the various internal control signals for generating appropriate cycle and sequence signals valid for the core clock domain that uniquely identify different core clock cycles.

In addition to the logic circuitry described above, the core clock synchronizer controller portion 400 also includes a skew state detector 416 (provided for generating a skew-state control signal, a phase detection signal (pd_z), and a sync_locked signal, which are provided to various functional blocks described above for generating other internal control signals) and a core domain synchronizer control signal generator 418 that is operable responsive to a skew_state control signal (indicative of a current skew relationship between the bus clock and core clock signals), configuration information (via the sync_config signal), and the internal control signals, i.e., clock and sequence signals and the sampled sync_ratio signal (indicative of what the clock ratio is, e.g., 5:4 or 4:3 or 1:1, et cetera), for generating a set of core domain synchronizer control signals towards the respective synchronizers 105A, 105B. Additional details regarding the overall functionality of these blocks and signals may be found the aforementioned cross-referenced U.S. patent applications.

Figure 6:
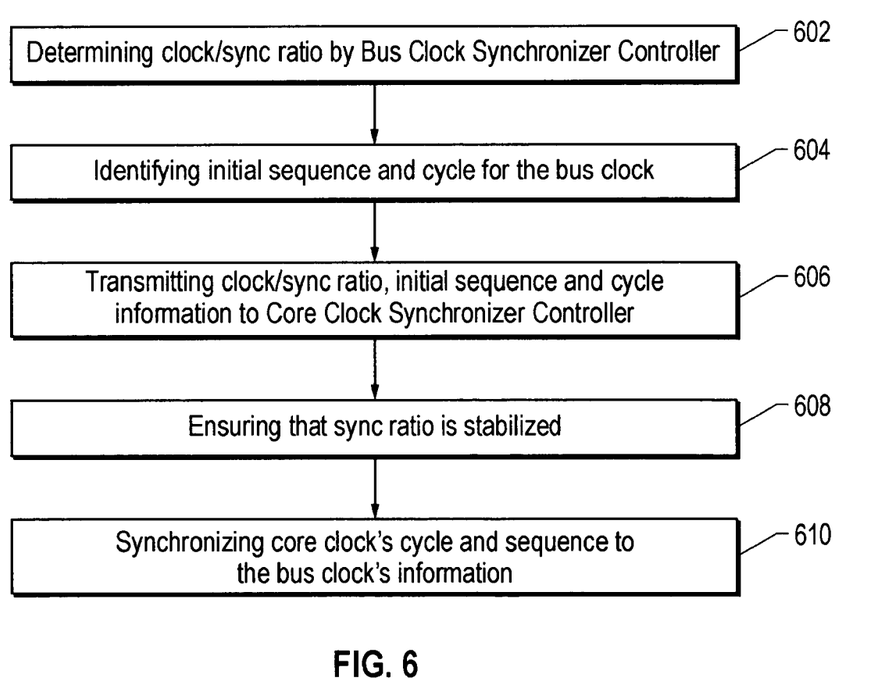
FIG. 6 depicts a flow chart of the various operations of a method in accordance with one embodiment of the invention for coordinating two synchronizer controllers disposed in different clock domains.

FIG. 6 depicts a flow chart of the various operations of a method in accordance with one embodiment of the invention for coordinating two synchronizer controllers disposed in different clock domains. Broadly, the coordination method involves generating a set of inter-controller clock relationship signals in one domain and passing them to the other domain, by which the controller circuitry in that domain may properly align its clock signal. As explained in the foregoing discussion, where the clock frequency ratio is N+1:N, but not 2:1, the inter-controller clock relationship signals are generated in the slower clock domain, e.g., a bus clock domain, in its synchronizer controller circuitry, which are then transmitted to the faster clock domain, e.g., a core clock domain. On the other hand, where the clock frequency ratio is 2:1, the generation of appropriate inter-controller clock relationship signals may be performed in the synchronizer controller circuitry of the faster clock for transmission to the slower clock domain's synchronizer controller circuitry.

In the embodiment depicted in FIG. 6, clock cycle information, i.e., initial clock cycle and sequence values, as well as the frequency ratio (i.e., sync ratio) are determined and identified in the bus clock domain by its synchronizer controller (blocks 602 and 604). Thereafter, a set of inter-controller clock relationship control signals indicative of the clock cycle information and ratio are transmitted to the core clock synchronizer controller (block 606). Responsive to the inter-controller clock relationship control signals, the core_clock signal is synchronized to the bus clock, that is, the core clock's cycle and sequence is aligned relative to the bus clock's cycle and sequence information (block 610). Further, logic components disposed in the core clock domain ensure that the sync ratio is stabilized (block 608) as part of the overall controller synchronization process.

Based on the foregoing Detailed Description, it should be appreciated that the controller arrangement embodiment set forth herein may be programmed for different latencies and skew tolerances for transferring data across a clock boundary between any two clock domains having any N:M ratio (e.g., M=N−1) wherein it is advantageous to have a controller in one clock domain for controlling its synchronizer and another controller in the other clock domain for controlling its synchronizer.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A system for coordinating synchronizer controllers disposed in a clock synchronizer arrangement, said clock synchronizer arrangement for effectuating data transfer between a core clock domain and a bus clock domain wherein said core clock domain is operable with a core clock signal and said bus clock domain is operable with a bus clock signal, said core and bus clock signals having a ratio, comprising:

means disposed in a bus clock synchronizer controller portion for generating a set of inter-controller clock relationship control signals, said means in said bus clock synchronizer controller portion being operable responsive to a SYNC pulse that is sampled in said bus clock domain by said bus clock signal; and means disposed in a core clock synchronizer controller portion operating responsive to said set of inter-controller clock relationship control signals for synchronizing cycle and sequence information associated with said core clock signal relative to said bus clock signal, wherein said means in said core clock synchronizer controller portion is operable responsive to said SYNC pulse that is sampled in said core clock domain by said core clock signal.

2. The system for coordinating synchronizer controllers disposed in a clock synchronizer arrangement as recited in claim 1, wherein said SYNC pulse is generated by a phase-locked loop (PLL) when a rising edge in said core clock signal is at least substantially coincident with a rising edge in said bus clock signal.

3. The system for coordinating synchronizer controllers disposed in a clock synchronizer arrangement as recited in claim 1, wherein said set of inter-controller clock relationship control signals includes a control signal indicative of an initial sequence and cycle with respect to said bus clock signal.

4. The system for coordinating synchronizer controllers disposed in a clock synchronizer arrangement as recited in claim 3, wherein said set of inter-controller clock relationship control signals includes a control signal indicative of a clock frequency ratio associated with said bus clock and core clock signals.

5. The system for coordinating synchronizer controllers disposed in a clock synchronizer arrangement as recited in claim 4, wherein said set of inter-controller clock relationship control signals includes a control signal that is derived by delaying said sampled SYNC pulse by a number of bus clock cycles.

6. The system for coordinating synchronizer controllers disposed in a clock synchronizer arrangement as recited in claim 5, wherein said means disposed in said core clock synchronizer controller portion includes a sync_ratio sampling means for sampling said control signal indicative of a clock frequency ratio associated with said bus clock and core clock signals.

7. The system for coordinating synchronizer controllers disposed in a clock synchronizer arrangement as recited in claim 5, wherein said means disposed in said core clock synchronizer controller portion includes a sequence sampling means for sampling said control signal indicative of an initial sequence and cycle with respect to said bus clock signal.

8. The system for coordinating synchronizer controllers disposed in a clock synchronizer arrangement as recited in claim 7, wherein said means disposed in said core clock synchronizer controller portion includes a delayed_sync sampling means for sampling said control signal that is derived by delaying said sampled SYNC pulse by a number of bus clock cycles.

9. The system for coordinating synchronizer controllers disposed in a clock synchronizer arrangement as recited in claim 5, further including means disposed in said core clock synchronizer controller portion for determining that said clock frequency ratio is stable.

10. A method of coordinating synchronizer controllers disposed in a clock synchronizer arrangement, said clock synchronizer arrangement for effectuating data transfer between a core clock domain and a bus clock domain wherein said core clock domain is operable with a core clock signal and said bus clock domain is operable with a bus clock signal, said core and bus clock signals having a ratio, comprising:

generating a set of inter-controller clock relationship control signals in a bus clock synchronizer controller portion operable responsive to a SYNC pulse that is sampled in said bus clock domain by said bus clock signal; and responsive to said inter-controller clock relationship control signals, synchronizing cycle and sequence information associated with said core clock signal relative to said bus clock signal in a core clock synchronizer controller portion operable responsive to said SYNC pulse that is sampled in said core clock domain by said core clock signal.

11. The method of coordinating synchronizer controllers disposed in a clock synchronizer arrangement as recited in claim 10, wherein said SYNC pulse is generated by a phase-locked loop (PLL) when a rising edge in said core clock signal is at least substantially coincident with a rising edge in said bus clock signal.

12. The method of coordinating synchronizer controllers disposed in a clock synchronizer arrangement as recited in claim 10, wherein said set of inter-controller clock relationship control signals includes .a control signal indicative of an initial sequence and cycle with respect to said bus clock signal.

13. The method of coordinating synchronizer controllers disposed in a clock synchronizer arrangement as recited in claim 12, wherein said set of inter-controller clock relationship control signals includes a control signal indicative of a clock frequency ratio associated with said bus clock and core clock signals.

14. The method of coordinating synchronizer controllers disposed in a clock synchronizer arrangement as recited in claim 13, wherein said set of inter-controller clock relationship control signals includes a control signal that is derived by delaying said sampled SYNC pulse by a number of bus clock cycles.

15. The method of coordinating synchronizer controllers disposed in a clock synchronizer arrangement as recited in claim 14, wherein said operation of synchronizing cycle and sequence information associated with said core clock signal relative to said bus clock signal includes sampling said control signal indicative of a clock frequency ratio associated with said bus clock and core clock signals.

16. The method of coordinating synchronizer controllers disposed in a clock synchronizer arrangement as recited in claim 14, wherein said operation of synchronizing cycle and sequence information associated with said core clock signal relative to said bus clock signal includes sampling said control signal indicative of an initial sequence and cycle with respect to said bus clock signal.

17. The method of coordinating synchronizer controllers disposed in a clock synchronizer arrangement as recited in claim 14, wherein said operation of synchronizing cycle and sequence information associated with said core clock signal relative to said bus clock signal includes sampling said control signal that is derived by delaying said sampled SYNC pulse by a number of bus clock cycles.

18. The method of coordinating synchronizer controllers disposed in a clock synchronizer arrangement as recited in claim 14, further including determining that said clock frequency ratio is stable for synchronizing cycle and sequence information associated with said core clock signal.

\* \* \* \* \*

UNITED STATES PATENT AND TRADEMARK OFFICE
CERTIFICATE OF CORRECTION

PATENT NO.         : 7,194,650 B2                                            Page 1 of 1
APPLICATION NO.    : 10/629989
DATED              : March 20, 2007
INVENTOR(S)        : Richard W. Adkisson It is certified that error appears in the above-identified patent and that said Letters Patent is hereby corrected as shown below:

In column 6, line 39, delete Azrangement" and insert -- Arrangement --, therefor.

In column 6, line 40, delete "Prograitunable" and insert -- Programmable --, therefor.

In column 6, line 43, delete "Prograitunable" and insert -- Programmable --, therefor.

In column 12, line 3, in Claim 8, delete "claim 7" and insert -- claim 5 --, therefor.

In column 12, line 43, in Claim 12, after "includes" delete ".a" and insert -- a --, therefor.

Signed and Sealed this

Eleventh Day of November, 2008

JON W. DUDAS
*Director of the United States Patent and Trademark Office*